United States Patent [19]
Kato et al.

[11] Patent Number: 5,054,524
[45] Date of Patent: Oct. 8, 1991

[54] SOLID-COLOR WEAVE PATTERN BELT

[75] Inventors: Yasushi Kato, Shizuoka; Noriyoshi Tsurugi, Shimada; Hiroaki Suzuki, Shizuoka; Shigeji Ogata, Ayase, all of Japan

[73] Assignee: Nippon Seiko K.K., Tokyo, Japan

[21] Appl. No.: 365,639

[22] Filed: Jun. 13, 1989

[30] Foreign Application Priority Data

Jun. 14, 1988 [JP] Japan ................. 63-144699

[51] Int. Cl.⁵ ............................................ D03D 25/00
[52] U.S. Cl. .............................. 139/383 R; 139/416; 139/420 R; 139/426 R; 139/417
[58] Field of Search ............... 139/420 R, 383, R, 139/426 R, 392, 416, 417; 428/36.1, 225

[56] References Cited

U.S. PATENT DOCUMENTS

| | | | |
|---|---|---|---|
| 2,570,576 | 10/1951 | Lord | 139/383 R |
| 3,322,163 | 5/1967 | Hughes | 139/383 R |
| 3,550,956 | 12/1970 | Lowe | 139/383 R |
| 4,197,345 | 4/1980 | Worrall | 139/416 X |
| 4,370,784 | 2/1983 | Turnbull | 28/166 |

FOREIGN PATENT DOCUMENTS

62-28438 6/1987 Japan.
781932 8/1957 United Kingdom ............... 139/392

Primary Examiner—Andrew M. Falik
Attorney, Agent, or Firm—Armstrong, Nikaido, Marmelstein, Kubovcik, & Murray

[57] ABSTRACT

A solid-color weave pattern belt comprising a weave in which warps are arranged at such a high density that wefts are substantially hidden behind the warps. The weave comprises a 2/2 twill weave having four warp threading phases with warp threading arrangement units selected from three kinds of units formed by omitting one to three warp threading phases from the four warp threading phases. A plurality of at least one warp threading arrangement units are successively adjacent to each other, thereby forming an uneven weave pattern of wefts substantially hidden behind the warps on the surface of the belt.

8 Claims, 7 Drawing Sheets

SOLID-COLOR WEAVE PATTERN BELT

BACKGROUND OF THE INVENTION

The present invention relates to a solid-color weave pattern belt and more particularly to a solid-color weave pattern belt suitable for use in applications such as seat belts of automobiles and hanging belts of bags.

With the spread of users of automobiles in recent years, the demand for seat belts has been diversified.

In general, a 2/2 twill weave is used as a weave for the conventional seat belt. Further, in order to maintain the tenacity required of the seat belt, the warp density is so high that the wefts are substantially hidden behind the warps. For this reason, the twill angle of the warps relative to the longitudinal direction is very small, which makes it difficult to confirm the twill lines, so that only turnover lines of the twill and the difference of gloss due to the reflection of light rays are recognized. Therefore, the conventional 2/2 twill weave has become difficult to cope with the above-described diversification.

In order to cope with the above-described diversification, a seat belt having a pattern will be possibly proposed. However, if the pattern is formed by blend weaving of different kinds of yarns with different colors, it is very complicated to stock those different kinds of yarns in a production site and therefore inevitably disadvantageous from the viewpoint of cost. In order to avoid the disadvantage, Japanese patent application Kokai publication No. 62-28438 has proposed to render a weave pattern on a belt which is formed by making an interrupted portion in a twill weave line of a weave of 2/2 twill. However, although the weave pattern formed by interruption of a twill weave line is suitable in a relatively course pattern, is not suitable for a fine pattern or a unique pattern having no twill weave line and therefore lacks of freedom in designing pattern.

SUMMARY OF THE INVENTION

An object of the present invention is to provide a solid-color weave pattern belt having a high degree of freedom of designing patterns and to be able to form every possible weave patterns.

Another object of the present invention is to provide a solid-color weave pattern belt preferable for use of a seat belt and a hanging belt of a sports bag.

In order to attain the above-described objects, the solid-color weave pattern belt of the present invention comprises a weave in which warps are arranged at such a high density that wefts are substantially hidden behind the warps. The weave comprises a combination of at least one warp threading arrangement unit selected from three kinds of units formed by omitting one to three warp threading phases from 2/2 twill weave consisting of four warp threading phases and further a plurality of the above described warp threading arrangement units are successively adjacent to each other, thereby forming an uneven weave pattern on the surface of the belt.

DETAILED DESCRIPTION OF THE INVENTION

The warp used in the belt of the present invention is important for attaining the tenacity of the belt. The yarn of the warp may be in the form of any of a multi-filament yarn and a spun yarn. However, in seat belt applications, it is preferred to use a multi-filament yarn of a synthetic fiber. Preferable examples of the material for the synthetic fiber include polyesters, polyamides, and polyvinyl alcohols.

In the present invention, only yarns of the same material are used in the warp. Preferably the yarns are of the same size as well as of the same material.

There is no particular limitation with respect to the weft because the weft does not so much contribute to the belt tenacity as the warp. However, in general, it is preferred to use a weft made of the same material that of the warp and having a fineness the same as, or about ½ of, that of the warp.

As described above, the belt of the present invention comprises warps and wefts basically in a two-up-and-two-down weave (i.e., a weave of 2/2 twill) and has such a high warp density that the wefts are substantially hidden behind the warps.

Figure 4:
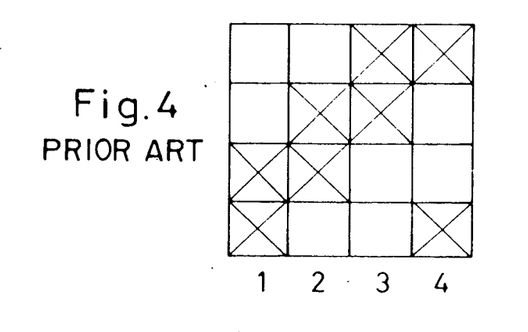
FIG. 4 is a diagram of a weave comprising a conventional 2/2 twill basic unit.

As shown in the prior art of FIG. 4, the weave of 2/2 twill used in a conventional seat belt comprises a basic warp arrangement unit wherein the warps are subjected to straight drafting of four kinds of warp threading phases 1,2,3 and 4 with successive one-stitch staggering of 2/2 twill weave. For example, the belt has a twill pattern like a pointed twill shown in FIG. 5. In this weave, the warps are represented by squares arranged in the longitudinal direction of the weave, while the wefts are represented by squares arranged in the lateral direction of the weave. Further, the squares marked with X represent the state where the warp passes over the weft (or the weft is under the warp), while the non-marked squares represent the state where the warp passes under the weft (or the weft is over the warp).

Figure 5:
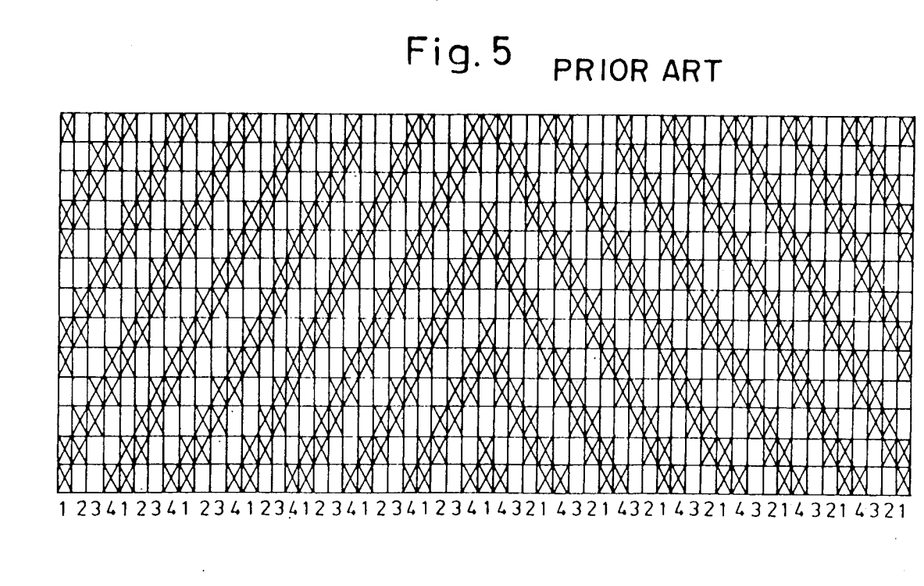
FIG. 5 is a diagram of a conventional pointed twill weave comprising the basic unit shown in FIG. 4.

However, as described above, in the conventional pointed twill weave as shown in the prior art of FIG. 5, an increase in the warp density renders the twill line vague and very monotonous.

Figure 2A:
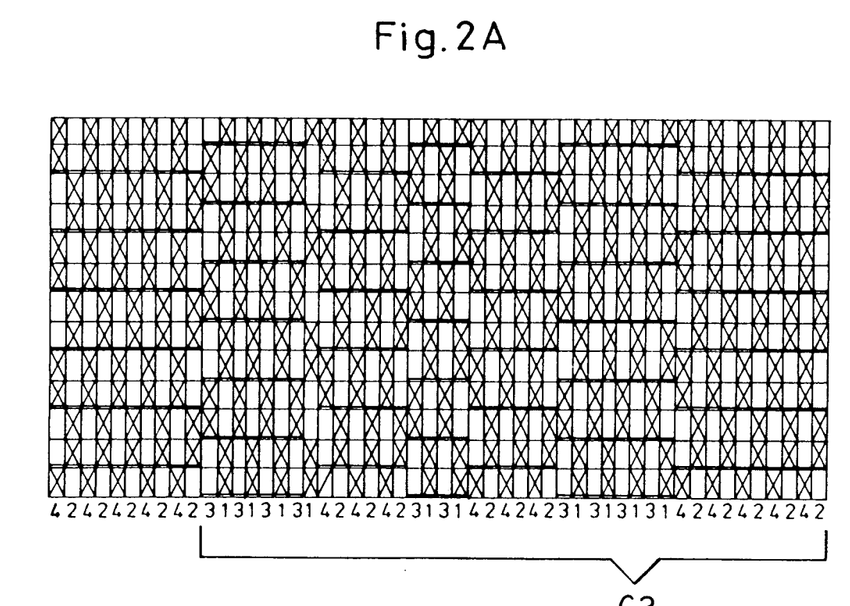
FIG. 2A is a diagram of 2/2 twill weave of a solid-color weave pattern belt according to another example of the present invention.
Figure 2B:
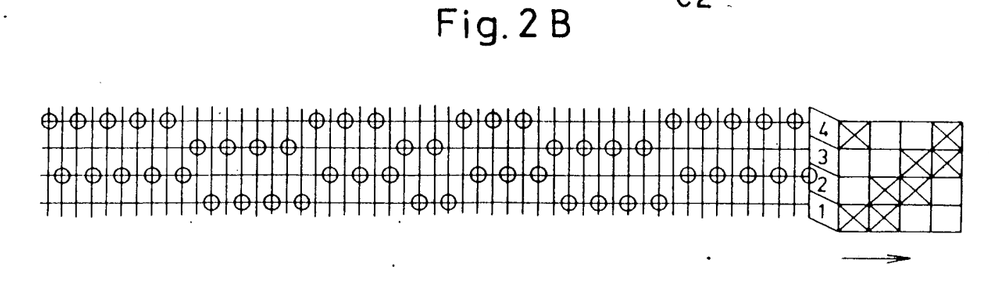
FIG. 2B is a diagram for threading of warps through heddles which corresponds to the diagram of FIG. 2A.
Figure 2C:
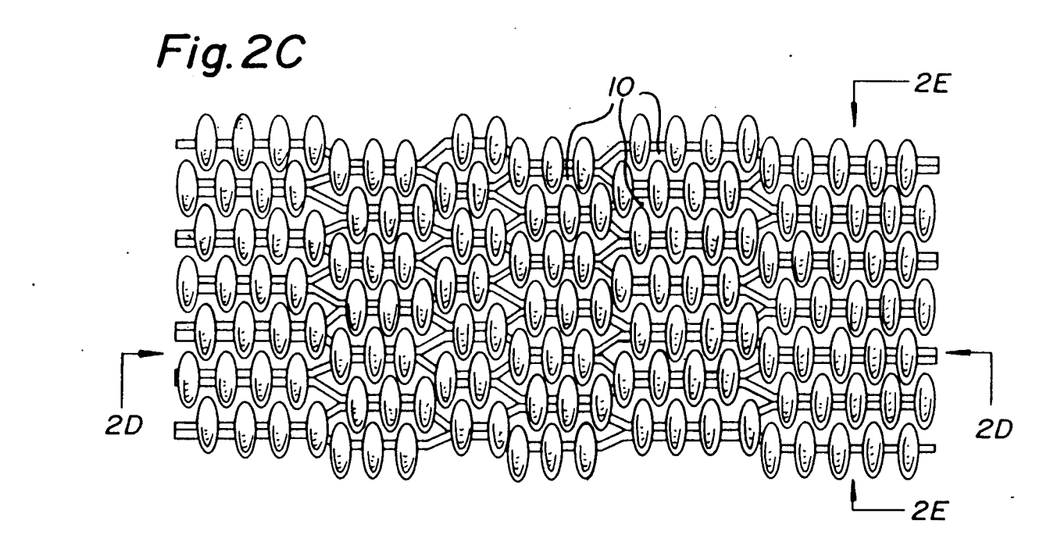
FIG. 2C is a perspective plan view of the weave pattern belt of FIG. 2A taken in the belt area designated by the bracket C2, FIG. 2A.
Figure 2D:
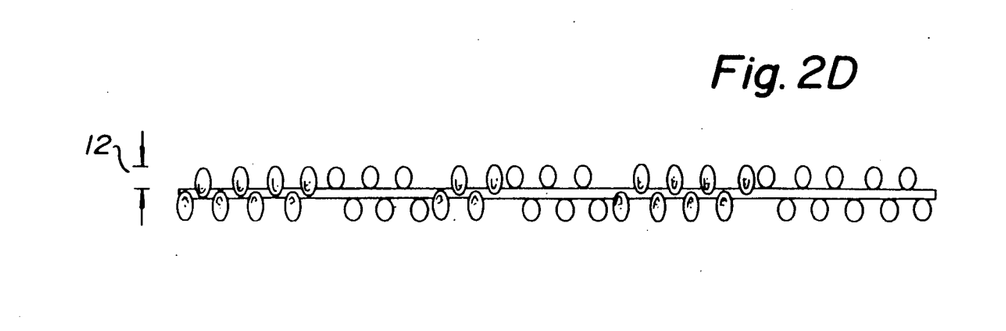
FIG. 2D is a sectional view taken at 2D—2D, FIG. 2C.
Figure 2E:
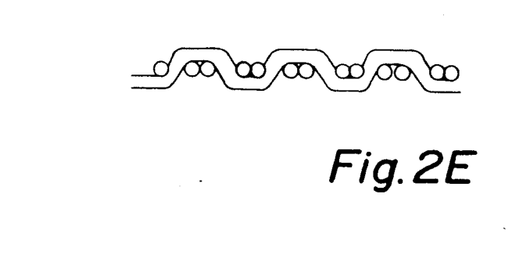
FIG. 2E is a sectional view taken at 2E—2E, FIG. 2C.
Figure 3A:
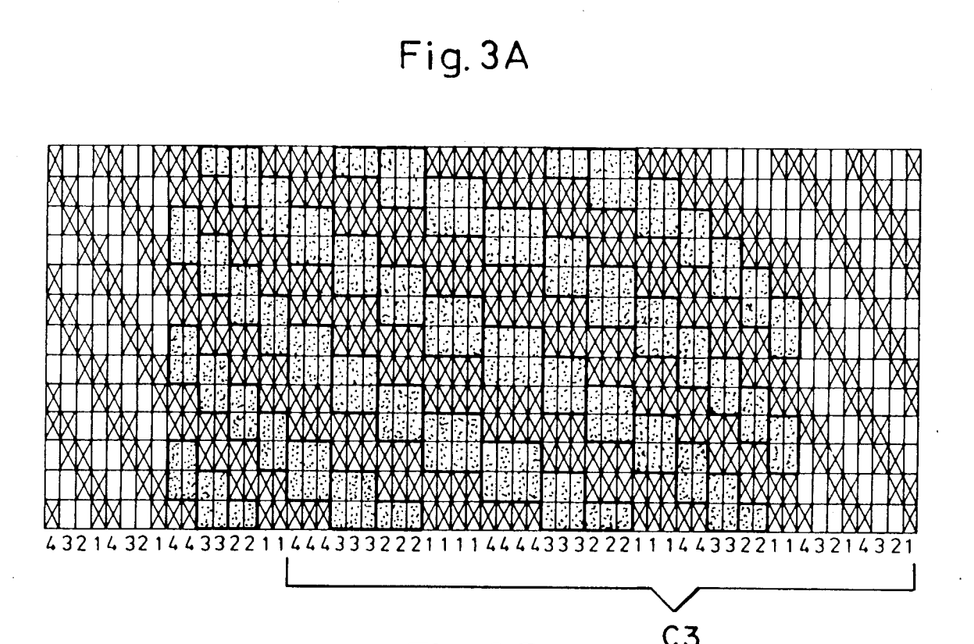
FIG. 3A is a diagram of 2/2 twill weave of a solid-color weave pattern belt according to further another example of the present invention.
Figure 3B:
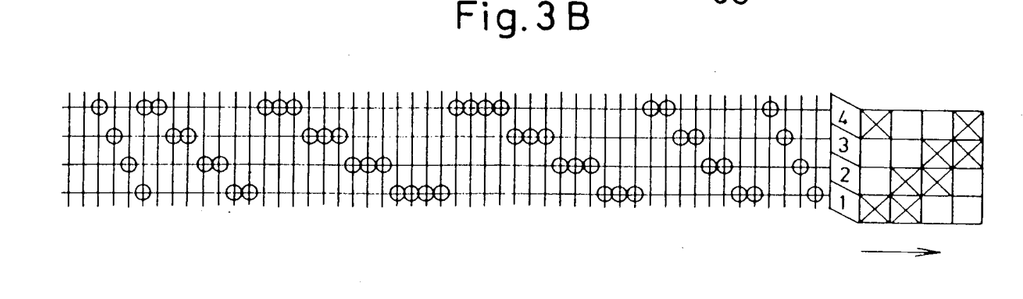
FIG. 3B is a diagram for threading of warps through heddles which corresponds to the diagram of FIG. 3A.
Figure 3C:
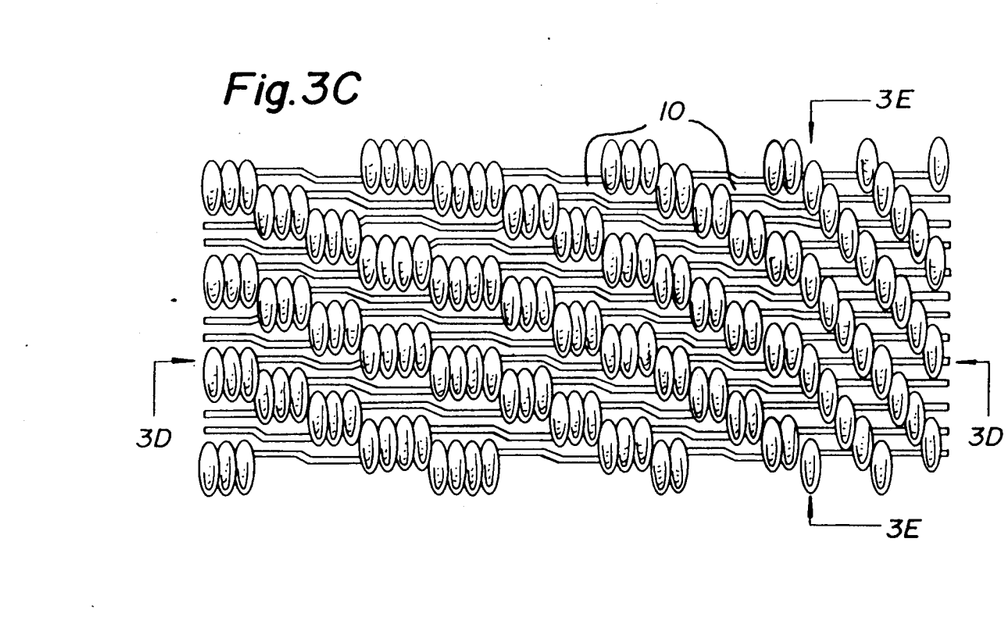
FIG. 3C is a perspective plan view of the weave pattern belt of FIG. 3A taken in the belt area designated by the bracket C3, FIG. 3A.
Figure 3D:
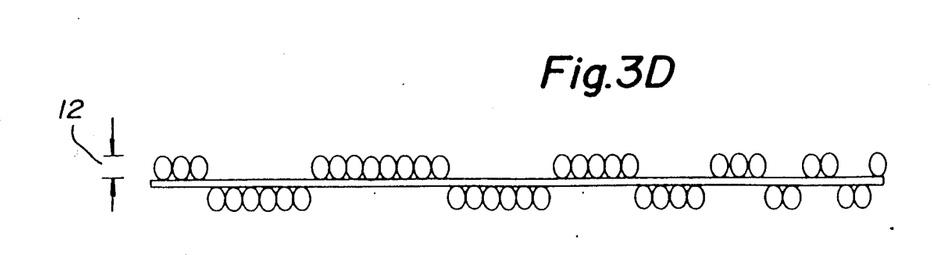
FIG. 3D is a sectional view taken at 3D—3D, FIG. 3C.
Figure 3E:
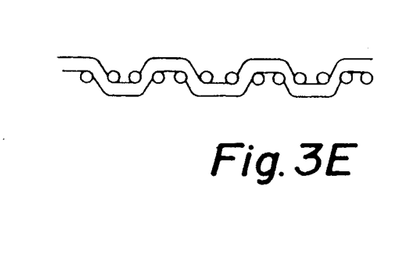
FIG. 3E is a sectional view taken at 3E—3E, FIG. 3C.

Also, the weave disclosed in the above-described Japanese patent application Kokai publication No. 62-28438, which has a weave pattern formed by making an interrupted portion in a twill weave line of 2/2 twill weave, is not able to make a fine pattern or a unique pattern having no twill weave line, although it is able to made a large pattern. According to the present invention, as described above, the weave pattern comprises a combination of at least one warp threading arrangement selected from three kinds of units formed by omitting one to three warp threads or threading phases from 2/2 twill weave consisting of four warp threads or threading phases and further a plurality of the above described warp threading arrangement units are successively adjacent to each other, thereby forming an uneven weave pattern on the surface of the belt. This irregular arrangement of the warp threading enables a distinct uneven weave pattern to be formed on the surface of the belt. Specifically, in the 2/2 twill weave comprising the above irregular warp threading arrangement according to the present invention, noticeable recesses 10, FIGS. 1C, 2C, 3C, are formed, and the depth 2, FIGS. 1D, 2D, 3D of the recess is as large as about at least 50% of the thickness of the warp. Therefore, it is possible to form a weave pattern which can be clearly recognized with naked eyes and also a fine pattern as well as a large one or an unique pattern having no twill weave line.

Examples of the omission of one warp threading phase include the following arrangement.

Specifically, the conventional 2/2 twill weave like a pointed twill shown in FIG. 5 is formed by repeating a basic unit consisting of four kinds of warp threading phases 1,2,3 and 4 or 4,3,2 and 1 shown in FIG. 4, i.e., comprises the following arrangement:

... 123(4)12(3)41(2)34(1)234 ...

By contrast, in the present invention, a parenthesized threading phase is omitted from the above arrangement to form the following arrangement:

... 123124134234 ...

Figure 1A:
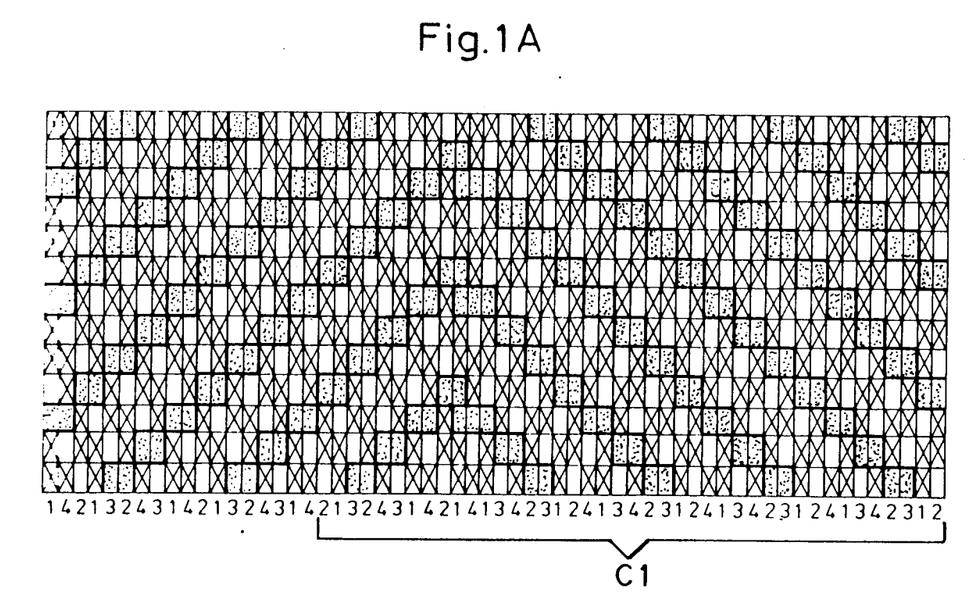
FIG. 1A is a diagram of 2/2 twill weave of a solid-color weave pattern belt according to an example of the present invention.
Figure 1B:
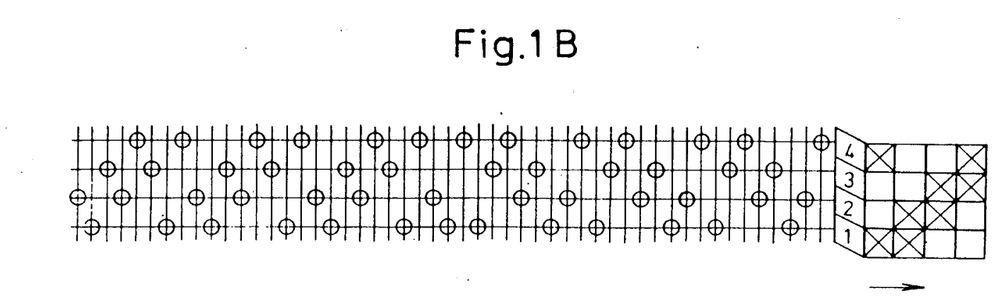
FIG. 1B is a diagram for threading of warps through heddles which corresponds to the diagram of FIG. 1A.
Figure 1C:
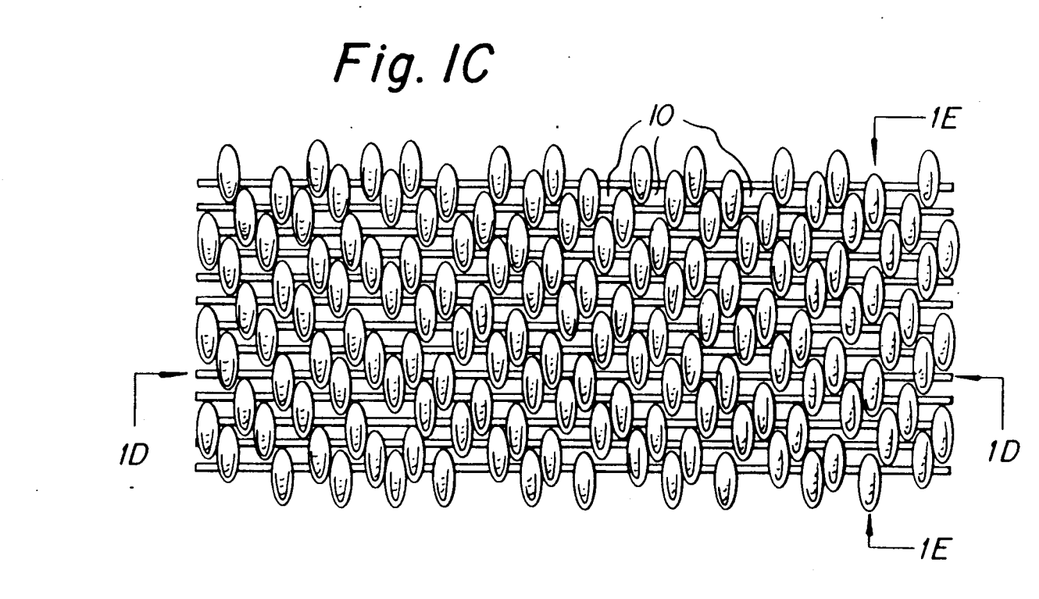
FIG. 1C is a perspective plan view of the weave pattern belt of FIG. 1A taken in the belt area designated by the bracket C1, FIG. 1A.
Figure 1D:
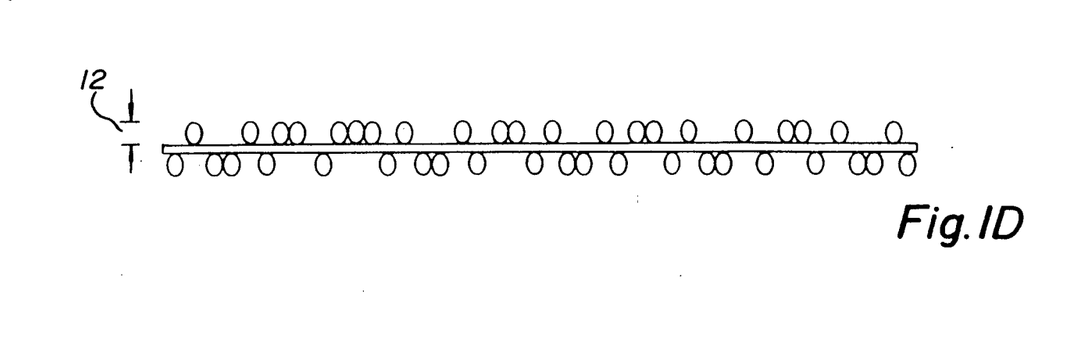
FIG. 1D is a sectional view taken at 1D—1D, FIG. 1C.
Figure 1E:
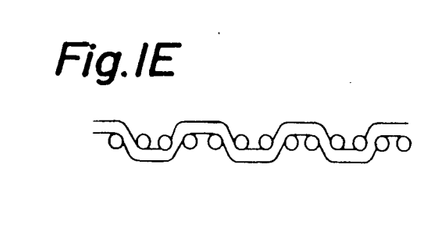
FIG. 1E is a sectional view taken at 1E—1E, FIG. 1C.

A 2/2 twill weave of an example of the arrangement according to the present invention is shown in FIGS. 1A and 1C. Also, a threading of warps through heddles is shown in FIGS. 1B and 1D. In FIGS. 1A-1E, from an arrangement comprising a combination of the following basic units is omitted one or two parenthesized warp threading phases from each basic unit one by one according to the above-described technique, thereby forming the following arrangement:

... 14(3)21(4)32(1)43(2)14(3)21(4)32(1)
43(2)14(3)21(4)32(1)43(2)14(3)214(32)1(2)
34(1)23(4)12(3)41(2)34(1)23(4)12(3)41(2)
34(12)34(1)23(4)12(3)41(2)34(12)34(1)23(4)
12 ...

Although as with the FIGS. 1A-1E, the 2/2 twill weave shown in FIGS. 2A-2E comprises a combination of an arrangement formed by omitting one parenthesized warp threading phase from each basic unit in the following arrangement with an arrangement formed by omitting two parenthesized warp threading phases from each basic unit in the following arrangement, it has a higher frequency of omission of the warp threading phase:

... 4(3)2(1)4(3)2(1)4(3)2(1)4(3)2(1)4(3)2(1)4(3)
2(14)3(2)1(4)3(2)1(4)3(2)1(4)3(2)1(4)3(2)
14(3)2(1)4(3)2(1)4(3)2(1)(4)3(2)1(4)3(2)
14(3)2(1)4(3)2(1)4(3)2(14)3(2)1(4)3(2)
1(4)3(2)1(4)3(2)14(3)2(1)4(3)2(1)4(3)2(1)
4(3)2(1)4(3)2 ...

In the present invention, the weave may comprise an arrangement unit formed by omitting three threading phases from the above-described base unit. The omission of three warp threading phases causes only one threading phase to be left, thus forming an arrangement comprising the same phases running in a row. FIGS. 3A-3E is a weave pattern wherein a plurality of warps constituting each arrangement unit and having the same warp threading phase are doubled and the number of doubled warps is successively changed in the arrangement units adjacent to each other.

In the 2/2 twill weave according to the present invention formed by the above-described irregular threading, a noticeable recess having a depth as large as about 50% of the thickness of the warp appears in an area where the warp passing over the weft (a square marked with X) exists in only one row and not in two or more rows or in an area where the warp passing under the weft (a non-marked square) exists in three or more rows. A plurality of the recesses arrange regularly to form an uneven pattern.

Although the above-described belt of the present invention is best suited for use as a seat belt, it may be also applied to other fashionable small-width woven fabrics such as hanging belts of sports bags.

As described above, according to the present invention, a pattern comprising noticeable unevennesses can be formed by a warp threading arrangement comprising at least one arrangement unit selected from those three kinds of units formed by omitting one to three warp threading phases from 2/2 twill threading phases consisting of four warps, in which the arrangement units are successively adjacent to each other. Also, all sorts of patterns such as a fine pattern, a large pattern and a pattern without twill weave line are possible to be formed.

What is claimed is:

1. A solid-color weave pattern belt comprising warps arranged at such a high density that wefts are substantially hidden behind said warps and are arranged with selectively omitted one to three warp threads omitted from the weave of a 2/2 twill weave consisting of four warp threads, said selectively omitted warp threads being successively adjacent to each other, thereby providing an uneven weave pattern of recesses in said weave pattern on a surface of said belt in a depth as large as about at least 50% of the thickness of the warp.

2. A solid-color weave pattern belt according to claim 5, wherein all of said warps are made of the same material.

3. A solid-color weave pattern belt according to claim 5, wherein said warp is a multi-filament yarn of a synthetic fiber.

4. A solid-color weave pattern belt according to claim 3, wherein said warp is a synthetic fiber selected from a group consisting of polyester fiber, polyamide fiber and polyvinyl alcohol fiber.

5. A solid-color weave pattern belt comprising warps arranged at such a high density that wefts are substantially hidden behind said warps and are arranged with selectively omitted one warp thread omitted from the weave of a 2/2 weave consisting of four warp threads, said selectively omitted warp thread successively changing in said four warp threads, whereby said belt has a surface with an uneven weave pattern wherein said uneven weave is at a depth of recesses of about at leave 50% of the thickness of the warp.

6. A solid color weave pattern belt comprising warps arranged at such a high density that wefts are substantially hidden behind said warps and are arranged with selectively omitted two warp threads omitted from the weave of a 2/2 twill weave consisting of four warp threads, said selectively omitted warp threads in a first weave group being different from those in a second weave group and forming a belt surface with an uneven pattern of recesses, the depth of said recesses being as large as about at least 50% of the thickness of the warp.

7. A belt according to claim 6, wherein the number of warp threads in said first group and the number of warp threads in said second group are successively changed.

8. A solid color weave pattern belt comprising warps arranged at such a high density that wefts are substantially hidden behind said warps and are arranged with selectively omitted three warp threads omitted from the weave of a 2/2 twill weave consisting of four warp threads, a plurality of units of the same three warp threads omitted from said four warp threads successively adjacent to one another, said selectively omitted three warp threads successively changing whereby said belt has a surface thereof with an uneven weave pattern.

* * * * *